United States Patent [19]

SerVaas

[11] Patent Number: 4,781,029

[45] Date of Patent: Nov. 1, 1988

[54] METHODS AND APPARATUS FOR OCEAN THERMAL ENERGY CONVERSION USING METAL HYDRIDE HEAT EXCHANGERS

[75] Inventor: Paul R. SerVaas, Indianapolis, Ind.

[73] Assignee: Hydride Technologies Incorporated, Indianapolis, Ind.

[21] Appl. No.: 58,828

[22] Filed: Jun. 5, 1987

[51] Int. Cl.$^4$ .............................................. F03G 7/04
[52] U.S. Cl. .................................... 60/641.7; 60/648; 60/649; 60/673
[58] Field of Search ................. 60/641.1, 641.6, 641.7, 60/641.9, 648, 649, 673, 659, 651, 671, 650, 682

[56] References Cited

U.S. PATENT DOCUMENTS

| | | | |
|---|---|---|---|
| 3,965,362 | 6/1976 | Harvey | 60/648 X |
| 4,090,361 | 5/1978 | Terry et al. | 60/649 |
| 4,425,318 | 1/1984 | Maeland et al. | 423/644 |
| 4,440,736 | 4/1984 | Maeland et al. | 423/644 |
| 4,440,737 | 4/1984 | Libowitz et al. | 423/644 |
| 4,600,525 | 7/1986 | Baker et al. | 252/184 |

OTHER PUBLICATIONS

J. J. Reilly and Gary D. Sandrock, "Hydrogen Storage in Metal Hydrides," *Scientific American*, Feb., 1980.
P. N. Golben and E. Lee Huston, "A Technique for Analyzing Reversible Metal *Hydride System Performance*," presented at the *International Symposium* on the *Properties and Applications* of Metal Hydrides, Toba, Japan, May 30–Jun. 4, 1982.
Thomas E. Hinkebein, Clyde J. Northrup and Albert A. Henckes, "Closed-cycle Hydride Engines," Sandia Laboratories, Dec., 1978.
R. Burton, "A Solar-Powered Diaphram Pump," *Solar-Energy*, vol. 31, No. 5, pp. 523–525, 1983.
Terry R. Penney and Desikan Bharathan, "Power From the Sea," *Scientific American*, Jan. 1987..

Primary Examiner—Stephen F. Husar

[57] ABSTRACT

Methods and apparatus for ocean thermal energy conversion using metal hydride heat exchangers to power a turbine by desorbing and absorbing hydrogen gas. Heat exchangers are alternatively floated to the ocean surface to warm the metal hydride bed or sunk to the bottom to cool the bed. The turbine powers an electric generator which produces electricity which may be utilized directly, stored in a superconducting magnet, used to desalinate water, or used to power the electrolysis of water in order to produce hydrogen for use as a fuel.

18 Claims, 7 Drawing Sheets

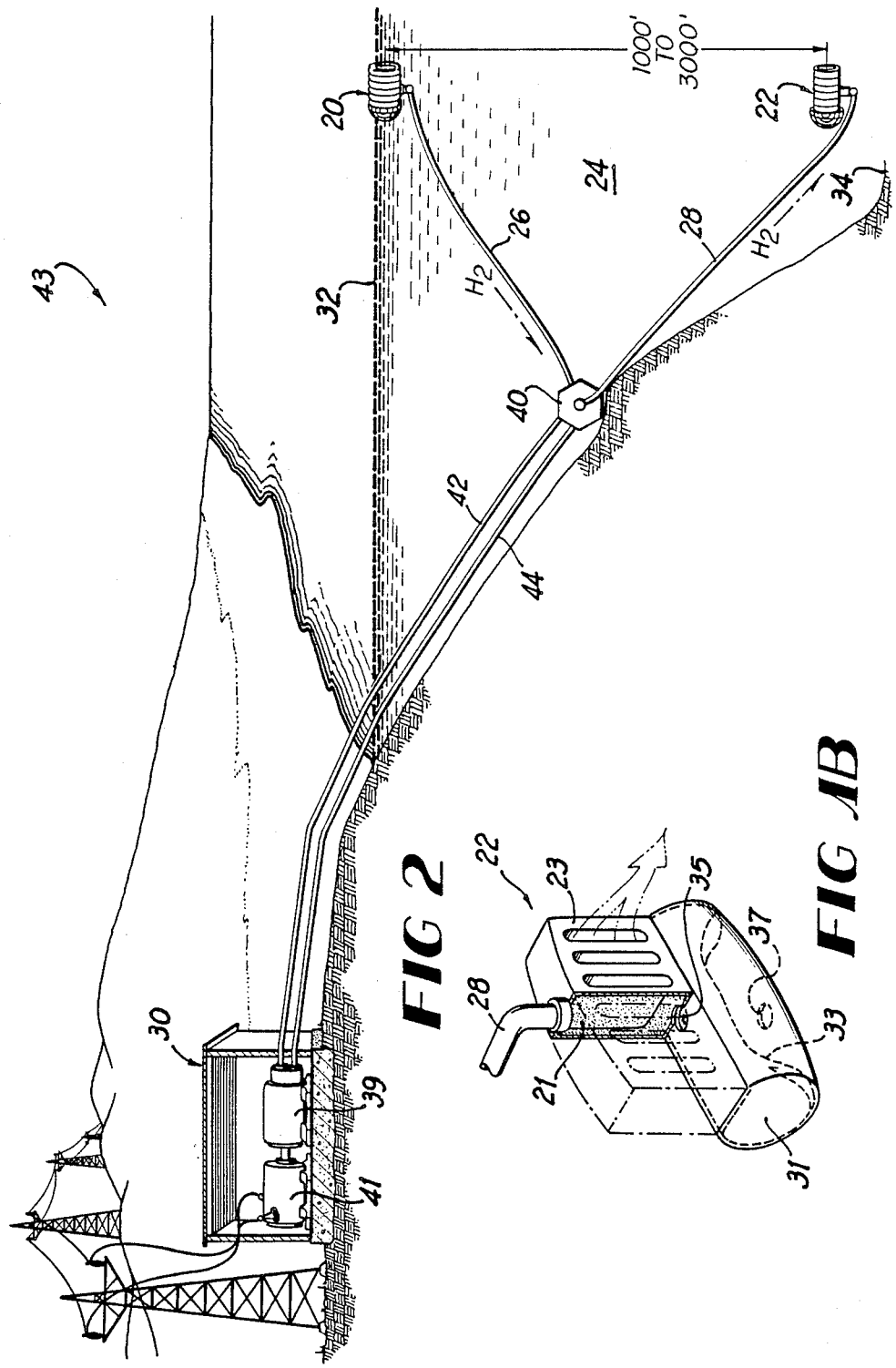

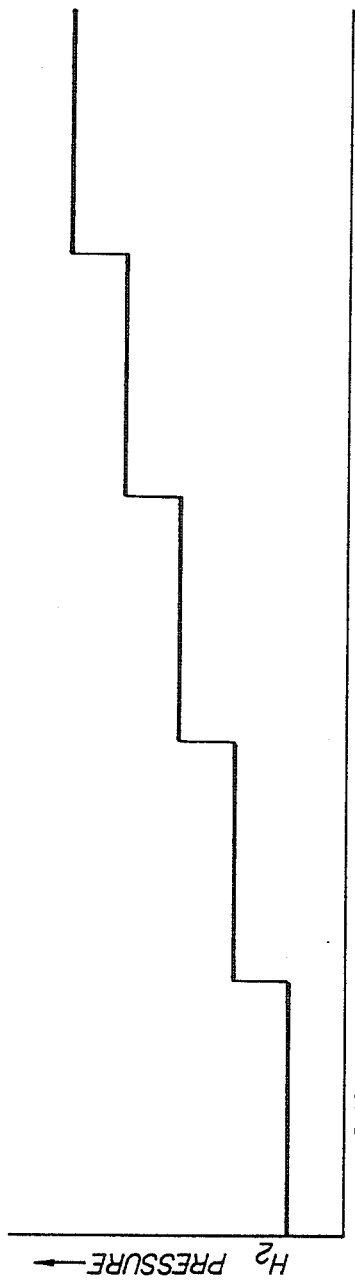
FIG. 11  CYCLE/POSITION OF H₂ IN EXCHANGER
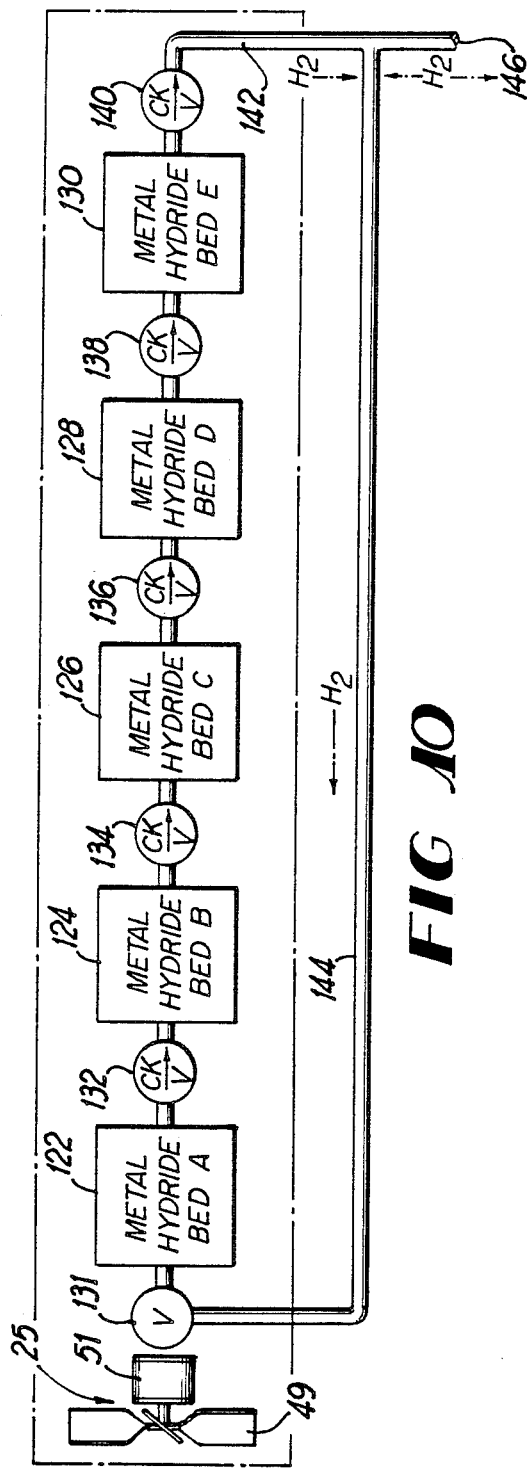
FIG. 10

METHODS AND APPARATUS FOR OCEAN THERMAL ENERGY CONVERSION USING METAL HYDRIDE HEAT EXCHANGERS

BACKGROUND OF THE INVENTION

The present invention relates to ocean thermal-energy conversion ("OTEC"), metal hydrides and superconductors.

Historically, closed-cycle heat engines have required working fluids such as ammonia or chloroflurohydrocarbons ("Freon") which are liquid during part of the engine cycle. Typically the fluid is pumped through a heat exchanger (or evaporater), where it is vaporized by the heat source being utilized. The vapor drives a turbine and the vapor must then pass through a second heat exchanger (the condenser) where the vapor returns to a liquid state before the cycle is repeated.

In the recent past, it has become possible to build heat engines utilizing metal hydrides which evolve hydrogen gas when they are heated and reabsorb the hydrogen when they are cooled. Such metal hydride heat engines are more efficient that conventional heat engines. In the metal hydride system, the hydrogen is evolved from a solid to a gaseous state under pressure and then is reabsorbed by a solid, and there is no requirement that it pass through a liquid phase. Larger changes in pressure at the same temperature differentials are possible utilizing metal hydrides than in conventional heat engines that use liquid/vapor working fluids.

Metal hydrides are formed by bringing gaseous hydrogen ($H_2$) in contact with a metal (M). The chemical reaction during which metal hydrides are formed is reversible. If the hydrogen gas pressure is above the equilibrium pressure (which is a function of the metals involved and temperature), the reaction between the hydrogen and metal occurs and the metal hydride is formed. Below equilibrium pressure, the metal hydride decomposes into the metal and gaseous hydrogen.

Formation of a metal hydride is an exothermic reaction; that is, heat is given off when the hydride is formed by reaction of hydrogen with the metal. Decomposition of the metal hydride back into metal and hydrogen gas requires the continuous addition of heat. Thus, by selection of appropriate metals and pressure conditions, it is possible to cause hydrogen to be given off by heating the metal hydride, and, alternatively, to cause hydrogen to be absorbed by cooling the hydride bed. Metal hydrides are further discussed in the article "Hydrogen Storage In Metal Hydrides," by J. J. Reilly and Gary D. Sandrock, *Scientific American*, February, 1980, which is incorporated herein by this reference. Additional background information useful in understanding the present invention is contained in the following United States patents and publications, all of which are incorporated herein by this reference:

U.S. Pat. No. 4,425,318 to Maeland et al. for "Hydriding Body-centered Cubic Phase Alloys At Room Temperature";

U.S. Pat. No. 4,440,736 to Maeland et al. for "Titanium-based Body-centered Cubic Phase Alloy Compositions in Room Temperature Hydride-forming Reactions Of Same";

U.S. Pat. No. 4,440,737 to Libowitz et al. for "Room Temperature Reaction Of Vanadium-based Alloys With Hydrogen";

U.S. Pat. No. 4,600,525 to Baker et al. for "Hydrogen Sorbent Flow Aid Composition and Containment Thereof";

"A Technique for Analyzing Reversible Metal Hydride System Performance," by P. N. Golben and E. Lee Huston, presented at the International Symposium on the Properties and Applications of Metal Hydrides, Toba, Japan, May 30–June 4, 1982;

"Closed-cycle Hydride Engines," by Thomas E. Hinkebein, Clyde J. Northrup and Albert A. Henckes, Sandia Laboratories, December, 1978;

"Use of Vanadium-based Solid Solution Alloys in Metal Hydride Heat Pumps," by G. G. Libowitz and A. J. Maeland, Allied-Signal Corporation; and "A Solar-Powered Diaphram Pump," by R. Burton, *Solar Energy* volume 31, number 5, pp. 523–525, 1983.

It has been recognized that temperature differentials in ocean water may be utilized to generate electricity, and efforts have been undertaken to accomplish that generation on a practical basis. Such efforts are summarized in "Power From The Sea," by Terry R. Penney and Desikan Bharathan in the January, 1987 issue of *Scientific American*, which is incorporated herein by this reference. As is well-recognized in the field of ocean thermal energy conversion (and as is illustrated in the drawing appearing on page 91 of the Penney and Bharathan article), one of the principal costs of OTEC systems is the expense associated with pipelines to carry warm and cold water to and from the generating facility. This is because a very substantial quantity of water must be utilized to operate a conventional OTEC system. Another problem associated with OTEC, as well as other conventional power generation systems, is the storage of electrical power generated by the system until it can be used, particularly in systems which generate power at a constant rate but supply distribution networks which have power demands which vary widely over time, as, for instance, during a twenty-four hour period.

An additional problem associated with closed-cycle heat engines utilizing chloroflurohydrocarbons is concern about the adverse environmental impact of atmospheric release of such materials, particularly including possible damage to the earth's ozone layer. Such concerns have resulted in calls for reduced use of chloroflurohydrocarbons, which may make it difficult or impossible to construct OTEC or other systems utilizing such working fluids. Finally, chloroflurohydrocarbon working fluids normally cannot be made to travel long distances through pipes without condensing before condensation is desired.

SUMMARY OF THE INVENTION

The present invention provides a practical and economical OTEC system by utilizing a pair of metal hydride bed heat exchangers which are alternatively heated or cooled by ocean water so that the metal hydride will alternately evolve and absorb hydrogen gas which is used as a working fluid to operate an electrical power generating turbine or other device capable of useful work. Numerous embodiments of the present invention are possible, including configurations in which the hydrogen gas is piped to and from an onshore turbine and configurations in which the electrical power is generated offshore and is transmitted to onshore locations for use. Electrical power generated in accordance with the present invention may also be utilized for the electrolysis of water in order to produce hydrogen fuel or for the desalination of water. Alternatively, the power may be stored in high-temperature superconducting magnets made possible by recent advances in superconductor technology.

BRIEF DESCRIPTION OF THE DRAWINGS

FIG. 1B is a detailed schematic diagram of a second embodiment of the metal hydride bed heat exchanger unit of FIG. 1 (near the ocean bottom).

FIG. 2 is a schematic diagram of an alternative embodiment of the present invention similar to FIG. 1 but intended for use where no deep water is available near the shore.

FIG. 10 is a schematic diagram of a multistage embodiment of the metal hydride bed heat exchanger of the present invention.

FIG. 11 is a graph showing the relative pressures of hydrogen gas within each stage of the multistage heat exchanger illustrated in FIG. 10.

DETAILED DESCRIPTION OF THE DRAWINGS

Figures 1, 1A:
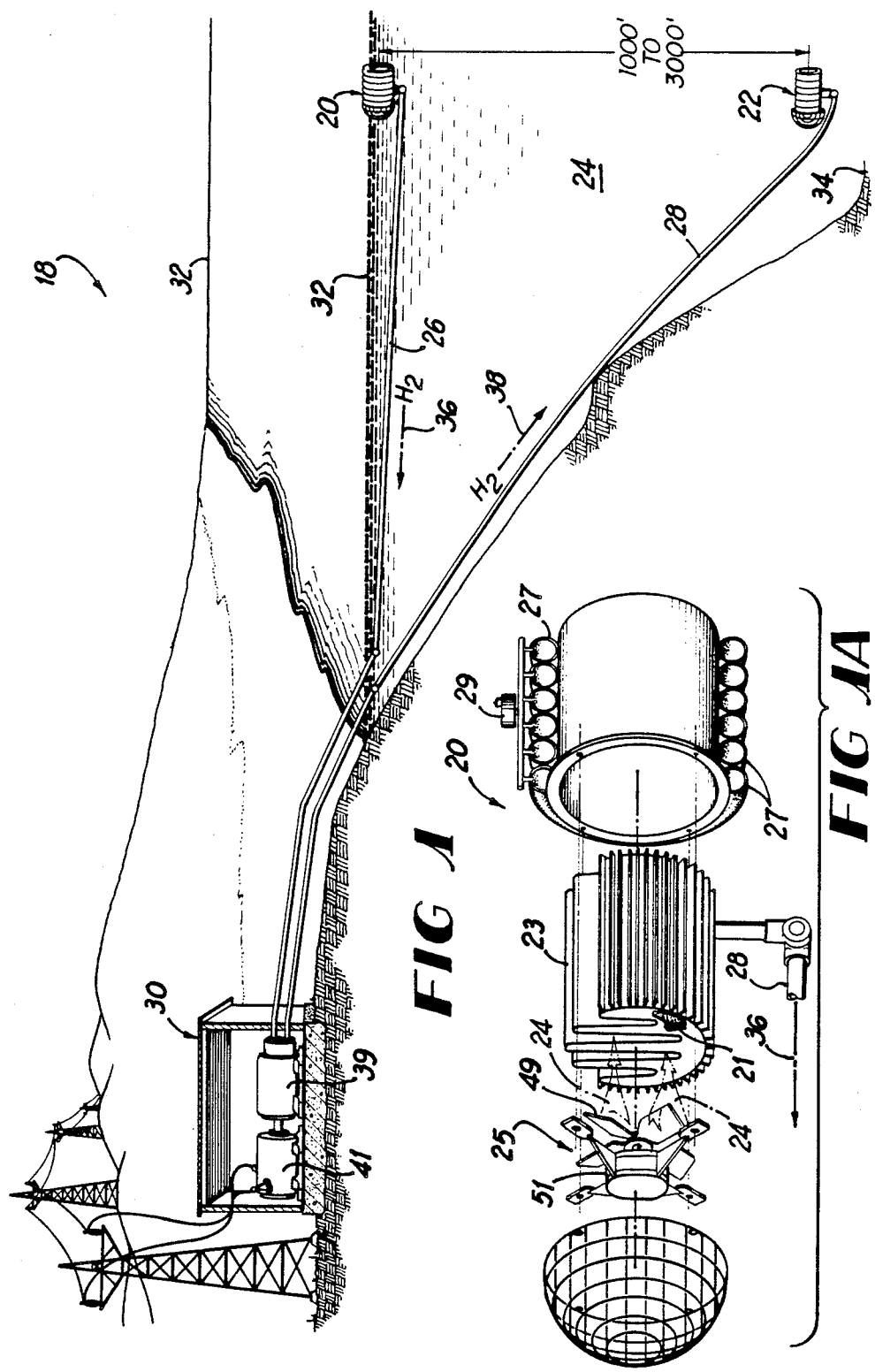
FIG. 1 is a schematic diagram illustrating a first embodiment of the present invention suitable for use where substantial ocean depths occur near the shore.
FIG. 1A is a schematic exploded perspective view of one embodiment of the metal hydride bed heat exchanger of FIG. 1 (near the ocean surface)

FIG. 1 schematically illustrates a first embodiment 18 of the OTEC metal hydride power generation system of the present invention. The system 18 includes metal hydride bed heat exchanger units 20 and 22 which are located in ocean 24 and are connected by flexible pipes 26 and 28, respectively, to a power plant 30 located on shore. Power plant 30 contains a hydrogen turbine 39 which drives a conventional electrical power generator 41. Metal hydride bed heat exchanger units 20 and 22 are located in a portion of ocean 24 having a significant temperature differential between surface water 32 and water at the bottom 34 of ocean 24. Depending on location and the physical parameters of the system 18 components selected, the required temperature differential may typically occur between the surface 32 and depths of as little as three hundred (300) feet, but depths of three thousand (3000) feet or more may be required. Each of metal hydride bed heat exchangers 20 and 22 has an associated bladder or other means for alternatively causing the exchanger to float at or near the ocean surface 32 or sink to the bottom 34, as is illustrated in more detail in FIGS. 1A and 1B and described in the associated text below.

Operation of the power generation system 18 is as follows. Metal hydride bed heat exchanger unit 20 initially contains a metal hydride bed 21 (see FIGS. 1A and 1B) fully charged with hydrogen. Warm ocean water 24 near the surface 32 heats the hydride bed 21, thereby causing pressurized hydrogen to evolve. Such heating may be facilitated by driving water past the hydride bed with any suitable conventional water propulsion means. The evolved hydrogen 36 travels through pipe 26 to power plant 30 where it drives a turbine 39 and generator 41 in order to generate electricity. High efficiency hydrogen turbines suitable for use in practicing the present invention have been developed by Ergenics, Inc. of Wyckoff, N.J. Additionally, according to the Penney and Bharathan Scientific American article cited above, "Workers at Westinghouse [Electric Corporation], Advanced Ratio Design, Inc., and the University of Delaware have designed [fiber-reinforced plastic] composite [turbine] blades that are long and slender like the blades of a helicopter and yet highly twisted and cambered like the blades of conventional low-pressure steam turbines." (p. 92). Such blades may be usable in a turbine used in practicing the present invention.

Hydrogen 38 expelled by the turbine 39 travels through pipe 28 to metal hydride bed heat exchanger 22 located near ocean 24 bottom 34. There, colder ocean 24 water near the bottom 34 cools the metal hydride bed 21 within heat exchanger 22, thereby causing hydrogen 38 to be absorbed into the bed 21 of exchanger 22. Again, ocean water may be propelled past the bed utilizing any conventional means of propulsion. Absorption and desorption of hydrogen by metal hydrides, while reversible, is carried out at varying rates depending on how saturated the metal hydride becomes. Accordingly, it typically is not practical to wait until all hydrogen has been desorbed from one hydride bed and absorbed by the other before "reversal-by-flotation" begins. Each system constructed in accordance with the present invention will have an optimal reversal equation that will be a function of depth, temperature differential, gas line lengths, gas line diameters, sea water flow rate through the heat exchangers, turbine design and the metalurgy of the metal hydrides selected. When most of the hydrogen 36 has been expelled from the metal hydride bed in heat exchanger 20 and the hydride bed in heat exchanger 22 has absorbed an economic quantity of hydrogen 38, the relative positions of heat exchangers 20 and 22 are reversed, and the cycle is then repeated. This reversal of the relative positions of exchanger units 20 and 22 may be accomplished by any suitable means for raising and lowering the units 20 and 22 at appropriate times.

One such raising and lowering means may be understood by reference to FIG. 1A, which is an exploded perspective view of an essentially schematic diagram of one embodiment of the metal hydride bed heat exchanger units 20 and 22. Recognizing that each unit 20 and 22 is identical in a particular embodiment of system 18, unit 20 will be understood by reference to FIG. 1A to include a metal hydride bed 21 contained in a heat exchanger vessel 23 which has any suitable structure to facilitate the exchange of heat between vessel 23 and surrounding sea water 24. Such heat exchange may be enhanced by a water impeller 25 which drives sea water 24 past and through heat exchanger vessel 23. Water impeller 25 may be a propeller 49 powered by an electric, photovoltaic, hydraulic or pneumatic motor 51. Such an electric motor may be powered by electricity generated by the system, by batteries or by another power source. Such a pneumatic motor may be powered by hydrogen gas in the system or by another source of gas such as compressed air. Optimal rate of water propulsion, depending on water temperature, power needs and other parameters, may be achieved by controlling propeller motor 51 with an appropriate microprocessor (not shown).

Attached to vessel 23 are air bladders 27 and inflation unit 29. Under appropriate automatic or remote control, inflation unit 29 alternatively inflates or deflates air bladders 27, thereby causing unit 20 to rise to the ocean surface 32 or sink to the bottom 34 as desired.

Inflation unit 29 includes tanks containing air or some other appropriate source of gas for inflating bladders 27 and valves and controls to permit inflation and deflation of bladders 27 at the desired times when hydride bed 21 has been largely charged with hydrogen or depleted of hydrogen as explained above. As an alternative to bladders 27 ballast tanks may be used which are alternatively filled with air or water to float and sink heat exchanger 22.

An alternative embodiment of heat exchanger units 20 and 22 is illustrated as unit 22' shown on the ocean 24 bottom 34 in FIG. 1B, where inflation unit 29 and air bladders 27 of unit 20 in FIG. 1A are replaced by a bladder tank 31 containing a bladder 33. An alternative heat exchanger vessel 23' functions as described above, and a water impeller 25 (not shown in FIG. 1B) may also be used as described above. Bladder tank 31 communicates with the interior of heat exchanger vessel 23 via an appropriate passage 35 which is controlled so that bladder tank 31 is substantially filled with hydrogen when hydride bed 21 has become fully charged with hydrogen while unit 22' is near ocean bottom 34. As bladder tank 31 fills with hydrogen, sea water inside of bladder 33 will be forced out of the tank 31 through opening 37, thereby causing tank 31 to become sufficiently buoyant to raise unit 22' to the ocean surface 32. Heat in the warmer ocean water near the surface 32 would then cause hydride bed 21 to expel hydrogen. When such expulsion has been fully accomplished, hydrogen pressure within tank 31 will reduce, permitting (with possible assistance of appropriate valves, assist drives and controls not shown) bladder 33 to fill with sea water through opening 37, thereby reducing the buoyancy of tank 31 and permitting unit 22' to sink to the ocean bottom 34 as an identical unit 22' rises to the ocean surface 32, thus permitting the cycle to be repeated. In a modified configuration of heat exchanger 22', bladder tank 31 would be purged of water utilizing compressed air rather than hydrogen.

As will be readily recognized by one skilled in the art, operation of lift devices such as bladder 27 or tank 31 and bladder 33 to cause alternative rise and fall of heat exchangers 20, 22 and 22' within ocean 24 may be accomplished by remote control from the power plant 30, by use of automatic controls associated directly with heat exchanger units 20 and 22 or, in the case of the embodiment illustrated in FIG. 1B, by appropriate selection of operating parameters for exchanger unit 22' so that tank 31 is alternatively automatically filled with water or hydrogen gas as desired.

Additionally, heat exchanger 20 may be designed so that water flows past water impeller 25 when exchanger 20 is sinking in such a manner that propeller 49 is rotated. If motor 51 is an electric motor also usable as an electric generator, energy utilized to raise exchanger 20 can be partially recovered by utilizing gravity to turn the impeller to produce electricity as exchanger 20 sinks to the bottom 34.

FIG. 2 schematically illustrates an alternative embodiment of the present invention substantially similar to FIG. 1 but intended for use in areas where sufficient ocean 24 depth does not occur near the shore to obtain the desired temperature differential, and heat exchangers 20 and 22 must be located further off shore. In the OTEC electrical generator system 43 illustrated in FIG. 2, pipes 26 and 28 from heat exchanger 20 and 22, respectively, connect not to the onshore power plant 30 but to a pipe pivot point 40. Pipes 42 and 44 connect pivot point 40 to power plant 30 and carry the hydrogen traveling to and from heat exchangers 20 and 22, respectively.

Pipes 26 and 28 in generation systems 18 and 43 (and the other systems described below) may be any pipes or hoses of sufficient diameter to carry the desired volume of hydrogen and of appropriate construction to bend or articulate as desired. Flexible hoses covered by protective convoluted spring sheaths may be successfully used as well as numerous other configurations matched to the requirements and conditions of a particular installation. The Penney and Bharathan *Scientific American* article cited above reports at p. 92 that a 0.3 meter flexible polyethylene pipe 1.5 kilometers long has been deployed at the Natural Energy Laboratory in Hawaii and that a one meter diameter polyethylene pipe of similar length is being constructed. Such polyethylene pipes may also be usable to practice the present invention.

Figure 3:
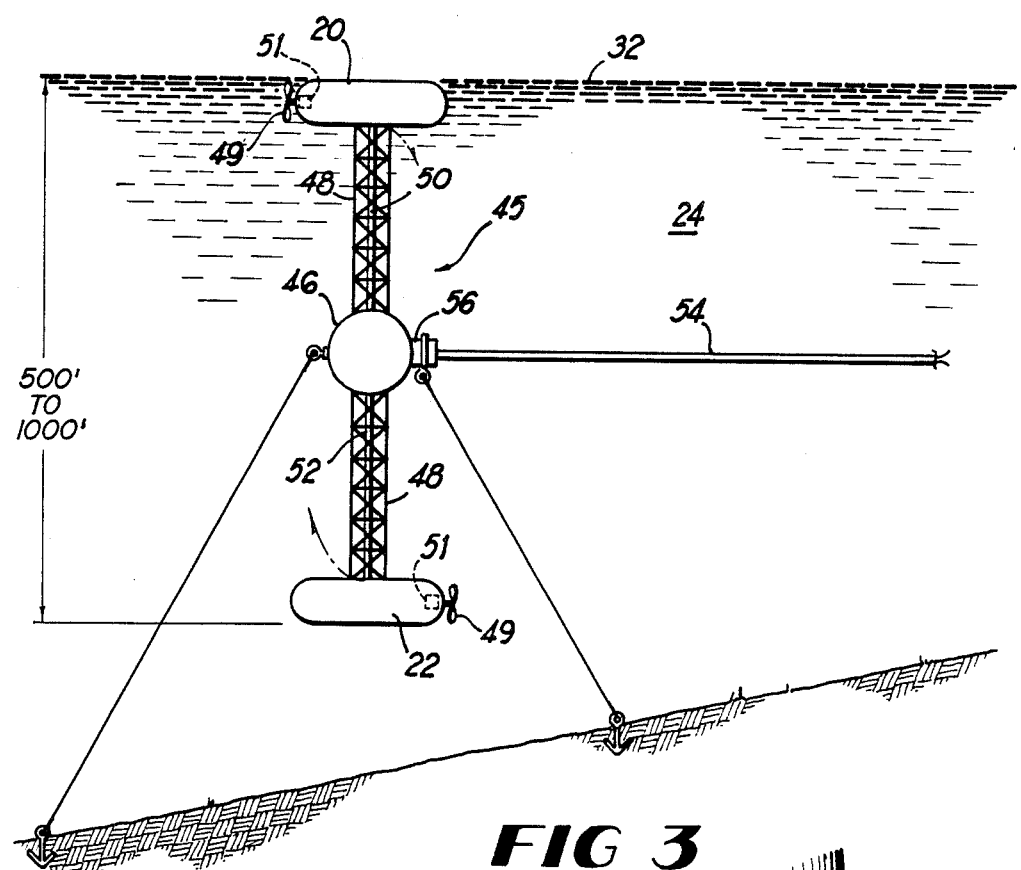
FIG. 3 is a schematic diagram of an alternative embodiment of the present invention utilizing metal hydride bed heat exchangers which form a unitary structure with the turbine and generator for near-shore production of electricity.

FIG. 3 illustrates another alternative embodiment of the present invention, unitary near-shore system 45, in which metal hydride bed heat exchangers 20 and 22 are rigidly connected to an underwater power plant 46 positioned midway between heat exchangers 20 and 22 and about which the heat exchangers rotate. Each of heat exchangers 20 and 22 is rigidly connected to submerged power plant 46 by an appropriate space truss 48 or other support adequate to provide the desired spaced but rigid connection. Pipes 50 and 52 carry hydrogen gas between heat exchangers 20 and 22, respectively, and power plant 46. Power plant 46 contains a hydrogen turbine turning an electrical generator and it transmits electrical power to shore by means of a cable 54. Appropriate rotating contacts 56 may be utilized to connect cable 54 to power plant 46 to avoid twisting of cable 54 during operation which occurs in substantially the same way as systems 18 and 43 described above. By contrast with systems 18 and 43 in FIGS. 1 and 2, however, unitary near-shore system 45 achieves its cycle reversal by rotating about its pivot, so that heat exchangers 20 and 22 are alternatively at ocean 24 surface or submerged beneath power plant 46.

Impellers 25 used to force sea water through the respective heat exchangers 20 and 22 can also be used to aid in the "reversal-by-flotation" process. By articulating the impellers 25 away from the heat exchangers 20 and 22, they may be used to more quickly pivot the structure (see FIGS. 3, 4 and 5) about its center. Alternatively, as described above, the impeller 25 on the sinking heat exchanger 20 could be used as a turbine to power a generator to create electricity thereby converting some of the potential energy of the falling heat exchanger 20 into useful work.

Figure 4:
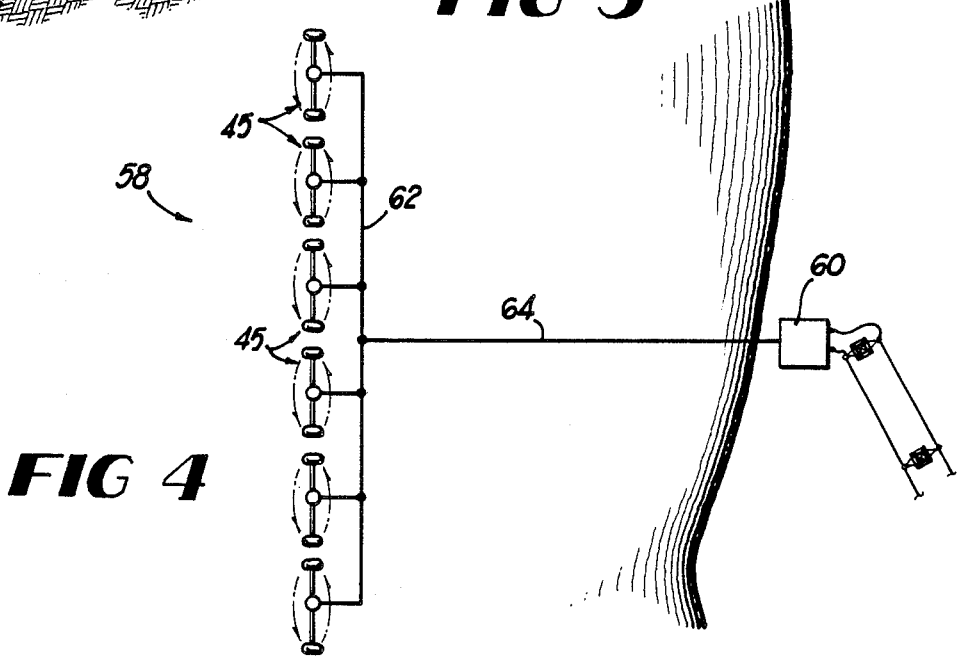
FIG. 4 is a schematic diagram of an aerial view of an electrical power generating network utilizing several units of the embodiment of the present invention illustrated in FIG. 3.

FIG. 4 illustrates an electrical generation network 58 utilizing the unitary near-shore system 45 illustrated in FIG. 3. Several such subsystems 45 are located offshore adjacent to an onshore power distribution station 60 and are interconnected by cable 62 and cable 64, which transmits power to power distribution station 60 located on shore.

Figure 5:
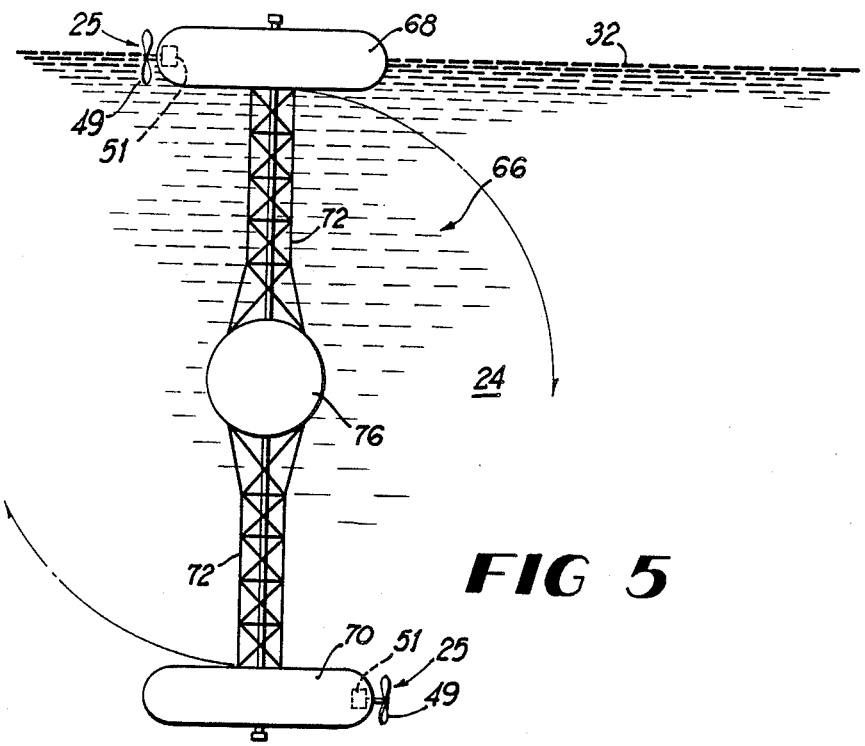
FIG. 5 is another alternative embodiment of the present invention generally similar to the unitary design of FIG. 3 but intended for offshore hydrogen production.

FIG. 5 is a schematic diagram of an alternative embodiment of the present invention utilizing a unitary offshore hydrogen production system 66 for the production of hydrogen through electrolysis. Unitary hydrogen production system 66, which is similar to near-shore system 45 illustrated in FIG. 3, comprises two metal hydride bed heat exchanger units 68 and 70 rigidly connected by space truss supports 72 and 74 to a centrally located hydrogen power generator 76. Hydrogen power generator 76 comprises a hydrogen turbine which powers an electrical generator which in turn powers a electrolysis unit which produces hydrogen from sea water in ocean 24 and stores it in an attached tank. Alternatively, the hydrogen turbine could be used to generate electricity which could then be stored in a superconducting magnet. Each of heat exchanger units 68 and 70 utilize more substantial bladders than similar units 20 and 22 so that the entire unitary generator unit 66 is floated by bladder attached to exchanger 68 when positioned as illustrated in FIG. 5. In order to harvest gas or electricity from the generator 76, bladders in both heat exchanger units 68 and 70 are inflated so that the entire structure floats to the surface, thereby making generator 76 accessible at ocean surface 32.

Figure 6:
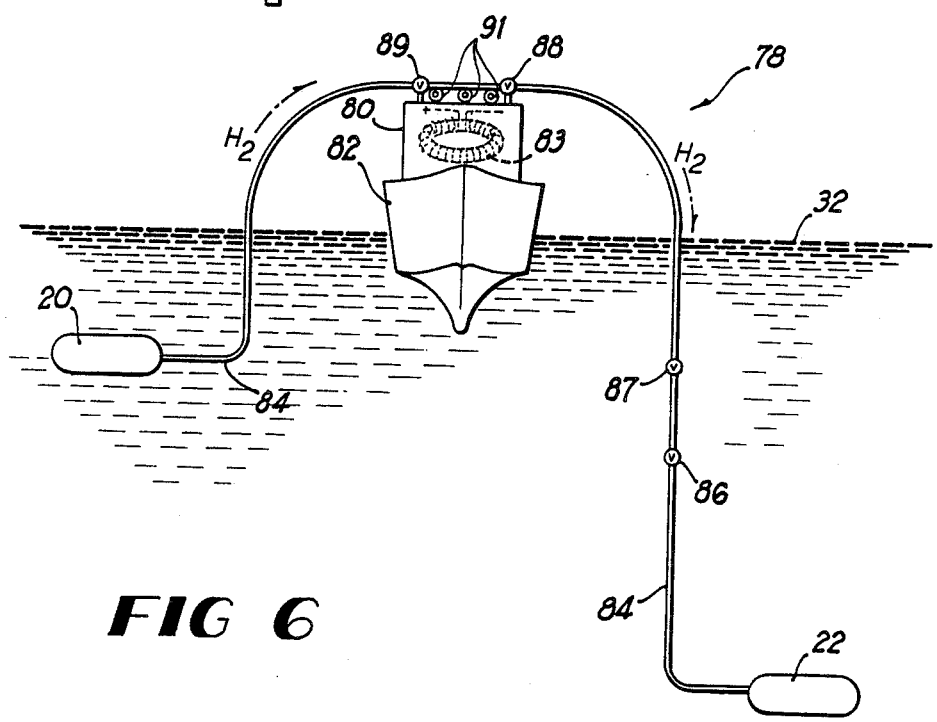
FIG. 6 is a schematic diagram of yet another embodiment of the present invention illustrating a ship, barge, or platform mounted power generator connected to the other elements of the present invention.

An alternative offshore embodiment of the present invention is illustrated in FIG. 6. Ship, barge or platform mounted generator 78 includes a power plant 80 mounted on a ship, barge or other offshore platform 82 and connected, by flexible pipe 84, to metal hydride bed heat exchangers 20 and 22, respectively.

FIG. 6 illustrates a means for reducing the length of hydrogen pipe 84 required for the system. This system also partially balances the energy requirements needed for the simultaneous lifting and submerging the heat exchangers 20 and 22. Heat exchanger 20 and 22 are connected by a single pipe 84 which has two pairs of valve/connectors, 86 and 87, and 88 and 89. Pipe 84 travels on rollers 91 so that valve/connectors 88 and 89, which are near the heat exchanger 20 end of pipe 84, connect to power plant 80 when heat exchanger 20 is near the surface 32. Valve/connectors 86 and 87 are near the heat exchanger 22 end of pipe 84 and connect to power plant 80 when heat exchanger 22 is near the surface 32.

Energy may be stored in ship-mounted generator 78 utilizing conventional batteries, by producing ice which is stored, as hydrogen by utilizing electrical energy to electrolyze water, or, preferably, in a high temperature superconductor magnet 83 mounted on platform 82 together with power plant 80. Pressurized hydrogen supplied by the system illustrated in FIG. 6 may also be utilized to supply pressure for salt water desalination processes which require pressurization, such as reverse osmosis filtration. Electrical power supplied by the system can likewise be used to power desalination processes.

Figure 7:
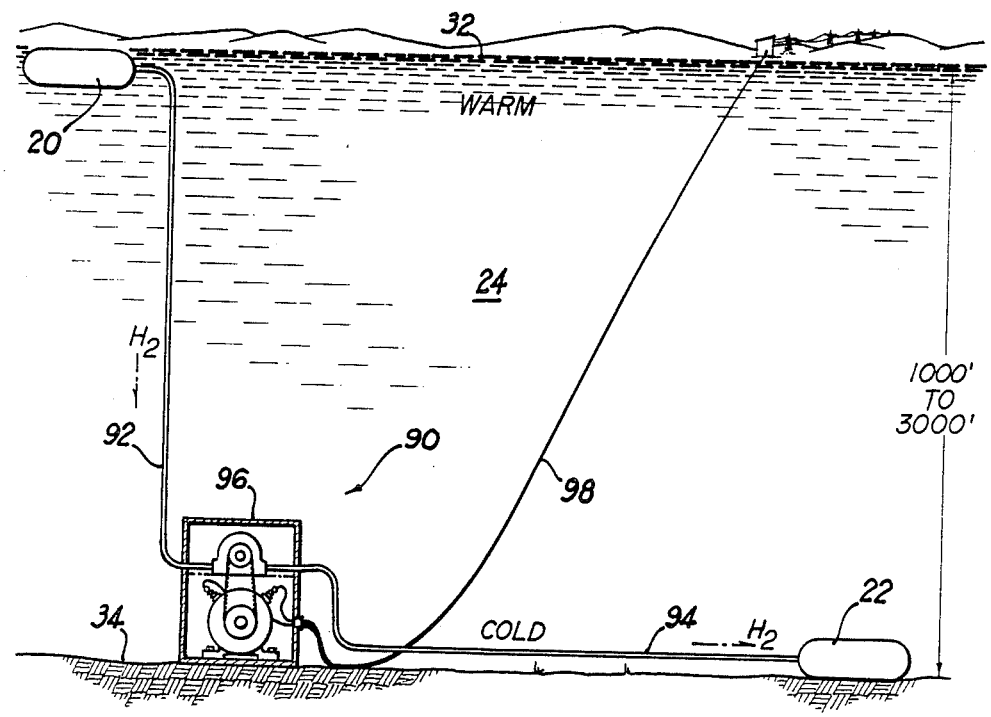
FIG. 7 is a schematic diagram of another embodiment of the present invention utilizing a submerged, stationary turbine and electrical power generator.

FIG. 7 illustrates a submerged stationary generator 90 in accordance with the present invention, which will be readily understood in light of the preceding discussion of other embodiments. Submerged generator 90 utilizes metal hydride bed heat exchangers 20 and 22 connected to a submerged, stationary power plant 96 by pipes 92 and 94 respectively. Power plant 96 contains a hydrogen turbine which runs an electrical power generator, and electrical power generated in power plant 96 is transmitted to shore via cable 98.

Figure 8:
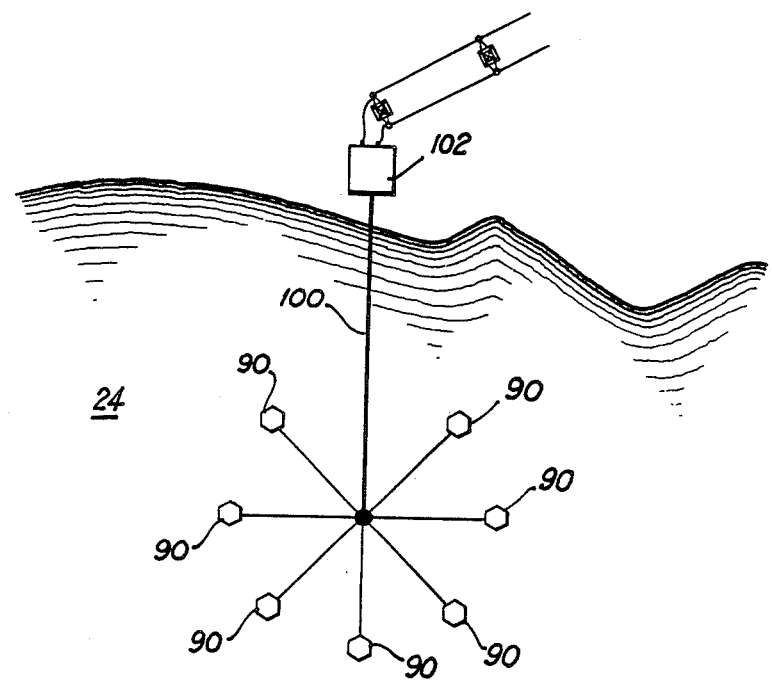
FIG. 8 is a schematic diagram of an aerial view of an electrical power generating network utilizing several units of the embodiment of the present invention illustrated in FIG. 7.

As will be readily appreciated by one skilled in the art, submerged generators 90 may be utilized in a network, as illustrated in FIG. 8, in which a plurality of such units 90 are interconnected by a cable 100 to an onshore power distribution station 102.

Figure 9:
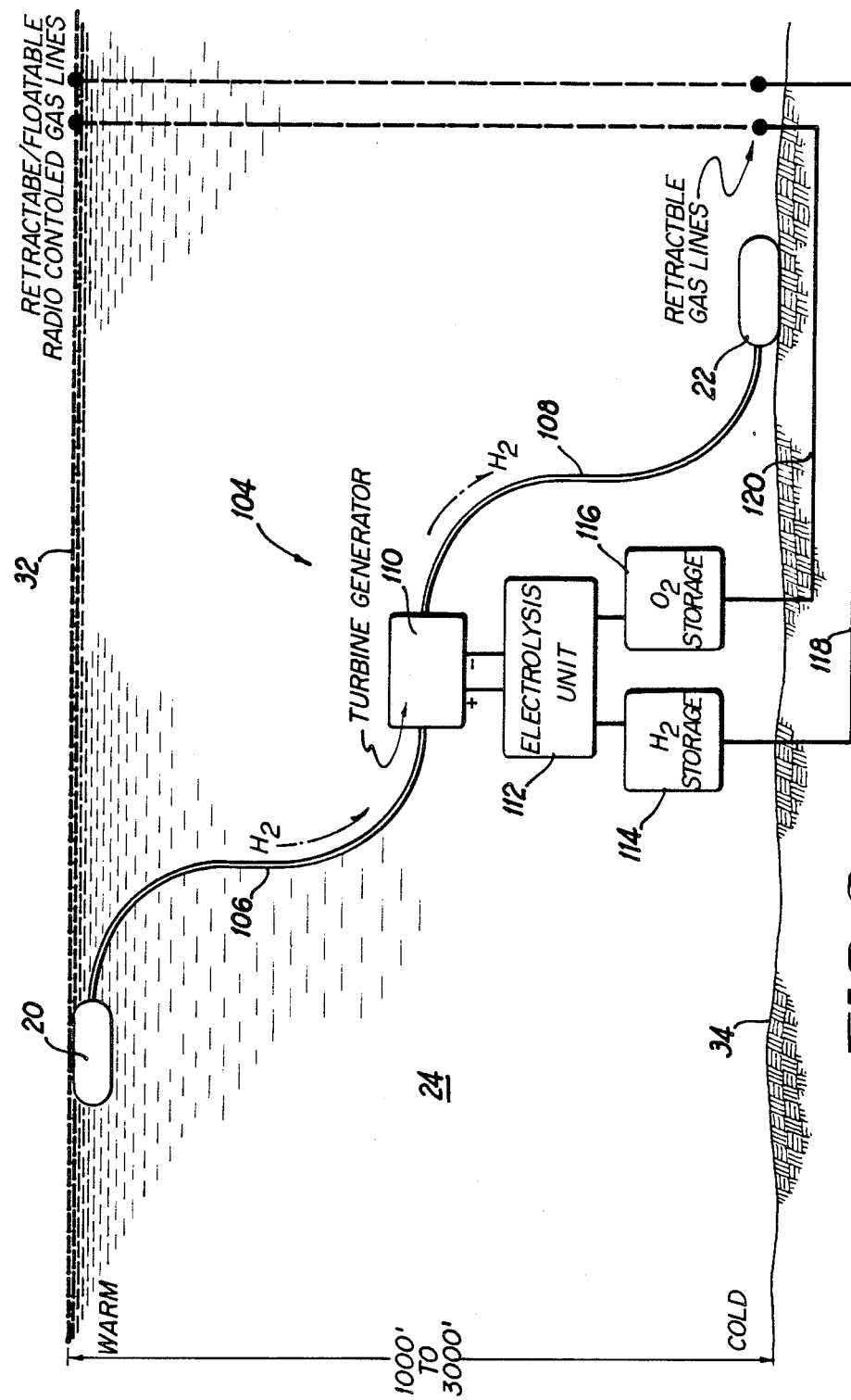
FIG. 9 is an schematic diagram of another embodiment of the present invention utilized for production of hydrogen and oxygen in a location remote from shore.

FIG. 9 illustrates yet another embodiment of the present invention utilized for production of hydrogen and oxygen in a location remote from shore. Offshore hydrogen and oxygen generator 104 comprises the familiar metal hydride bed heat exchangers 20 and 22 connected by pipes 106 and 108, respectively, to a submerged power plant 110 which outputs electricity to an associated electrolysis unit 112. Electrolysis unit 112 electrolyzes water into hydrogen and oxygen which is stored in tanks 114 and 116, respectively. Such storage tanks 114 and 116 may be economically manufactured because the substantial water pressure where they are utilized makes it possible to produce a pressure vessel which is not as strong as a vessel would have to be to store gas at the same gaseous pressure with the vessel located above the ocean at ambient atmospheric atmosphere. Retractable gas lines 118 and 120 carry hydrogen and oxygen from hydrogen storage tank 114 and oxygen storage tank 116, respectively, to the ocean surface to permit periodic harvesting of hydrogen and oxygen produced by generating station 104. Such gas lines 118 and 120 may be remotely controlled to float to the ocean surface when desired by radio or other appropriate conventional control means. Alternatively, oxygen produced by electrolysis unit 112 may be used to inflate bladders or ballast tanks (not shown) attached to heat exchanger 22 in order to provide the buoyancy necessary to raise exchanger 22 to the surface 32 when desired.

FIG. 10 illustrates a multi-stage heat exhanger 20' which it may be desirable to utilize with the present invention to achieve enhanced efficiency. Heat exchanger 20' contains five serially-connected metal hydride beds A, B, C, D and E numbered 122, 124, 126, 128 and 130, respectively. Check valves 132, 134, 136 and 138 between adjacent metal hydride beds 122, 124, 126, 128 and 130 permit hydrogen flow in only one direction between such beds, and check valve 140 similarly permits hydrogen flow only out of metal hydride bed E 130 into pipe 142. An impeller 25 promotes flow of water past metal hydride beds A-E, 122, 124, 126, 128 and 130, to promote exchange of heat between such beds and the ocean as explained above. Multistage heat exchanger 20' functions by utilizing metal hydride beds A-E, 122, 124, 126, 128 and 130, each of which contain different but matched metal hydrides, and successive stages utilize a metal hydride which functions with the same change in temperature but at a different hydrogen gas pressure.

By floating and sinking such a five-stage metal hydride heat exchanger 20' five times, hydrogen gas can be made to pass through the successive metal hydride beds and check valves with an increase of pressure at each stage as is illustrated graphically in FIG. 11. During each cycle, metal hydride bed E 130 exhausts hydrogen gas through check valve 140 into pipe 142 and from there through pipe 146 to the turbine (not shown in FIG. 10, but as described above). When heat exchanger 20' is near the ocean surface 32 during each cycle, low pressure hydrogen gas from the turbine flows through pipes 146 and 144 into metal hydride bed A 122 when heat exchanger 20' is near the ocean bottom 34.

Such a multi-stage heat exchanger 20' may be desirable in order to achieve sufficient hydrogen gas pressures to operate a turbine efficiently and in order to achieve sufficient hydrogen gas pressures to balance the substantial water pressures encountered near the ocean bottom 34.

Valve 131 which controls the input to metal hydride bed A 122 must be controlled to be open when heat exchanger 20' is near the ocean bottom 34 and hydrogen gas is being absorbed by metal hydride bed A 122. Valve 131 must be shut when heat exchanger 20' is floating near the surface to prevent high pressure hydrogen gas from metal hydride bed E 130 from flowing directly into metal hydride bed 122 through pipe 144 instead of to the turbine through pipe 146.

Similarly, valve 140 which controls the output of metal hydride bed E 130 must be controlled to be open when heat exchanger 20' is near the ocean surface 32 and hydrogen is being desorbed by metal hydride bed E 130. Valve 140 must be shut when heat exchanger 20' is near the ocean bottom 34 and hydrogen is being aborbed by metal hydride bed A 122.

The foregoing description of this invention is for purposes of explanation and illustration. It will be apparent to those skilled in the relevant art that modification and changes may be made to the invention as thus described without departing from its scope and spirit.

I claim:
1. A thermal energy conversion system, comprising:
   a. a means for converting the kinetic energy of pressurized hydrogen gas to another form of energy;
   b. a metal hydride bed heat exchanger for supplying hydrogen gas to and receiving hydrogen gas from the energy conversion means; and
   c. a means associated with the heat exchanger for changing the position of the exchanger in a body of water.
2. An ocean thermal energy conversion system, comprising:
   a. an electric generator;
   b. a hydrogen turbine to operate the electric generator;
   c. at least two metal hydride bed heat exchangers for supplying hydrogen gas to and receiving hydrogen gas from the turbine; and
   d. a means associated with each heat exchanger for changing the position of the exchanger in a body of water.
3. The ocean thermal energy conversion system of claim 2 wherein the position changing means comprises at least one inflatable bladder and a means for inflating and deflating the bladder.
4. The ocean thermal energy conversion system of claim 2 wherein the positioning means further comprises a tank which communicates with the heat exchanger to receive hydrogen gas from the heat exchanger and thereby expel water from the tank and increase its buoyancy and, alternatively, to supply hydrogen gas to the heat exchanger and thereby permit water to occupy the tank to decrease its buoyancy.
5. An ocean thermal energy conversion system according to claim 2, further comprising a means for moving water past each heat exchanger.
6. The ocean thermal energy conversion system of claim 2 wherein the electric generator and hydrogen turbine are positioned intermediate the heat exchangers.
7. An ocean thermal energy conversion system according to claim 6 further comprising substantially rigid structures interconnecting the electric generator and hydrogen turbine to each of the two metal hydride bed heat exchangers.
8. The ocean thermal energy conversion system of claim 2 wherein the electric generator and hydrogen turbine are located above the surface of the body of water.
9. The ocean thermal energy conversion system of claim 2 wherein the electric generator and the hydrogen turbine are submerged beneath the surface of the body of water.
10. An ocean thermal energy conversion system according to claim 2 further comprising a superconductor magnet to receive and store energy from the electric generator.
11. An ocean thermal energy conversion system according to claim 2 further comprising a water electrolysis unit powered by the electric generator.
12. An ocean thermal energy conversion system according to claim 11, further comprising at least one submerged pressure vessel for receiving pressurized hydrogen gas from the electrolysis unit.
13. A network of ocean thermal energy conversion systems, comprising a plurality of the systems recited in claim 2 interconnected to supply power to a single distribution point.
14. A method for converting heat energy in a body of water which has a temperature differential between two portions of the body of water, comprising the steps of:
   a. evolving hydrogen gas from metal hydrides positioned in a warm region of the body of water,
   b. passing the hydrogen gas through a means for converting energy contained in the gas into mechanical motion,
   c. absorbing the hydrogen gas in metal hydrides positioned in the cooler region of the body of water, and
   d. reversing the relative positions of the two metal hydride beds and repeating steps a–c.
15. The method of claim 14, further comprising the step of converting mechanical motion output by the converting means into electricity.
16. The method of claim 15, further comprising the step of utilizing the electricity to electrolyze water into hydrogen and oxygen.
17. The method of claim 15, further comprising the step of storing the electricity output by the generator as electromagnetic energy in a superconductor magnet.
18. The method of claim 14, wherein the step of changing the relative positions of the two metal hydride beds is accomplished by modifying the buoyancy of the beds.

* * * * *